United States Patent
Jung et al.

(10) Patent No.: US 11,503,451 B2
(45) Date of Patent: Nov. 15, 2022

(54) DEVICE AND METHOD FOR TRANSMITTING SIGNALS IN PLURALITY OF FREQUENCY BANDS

(71) Applicant: Samsung Electronics Co., Ltd., Gyeonggi-do (KR)

(72) Inventors: Buseop Jung, Gyeonggi-do (KR);
Bumjib Kim, Gyeonggi-do (KR);
Hyejung Bang, Gyeonggi-do (KR);
Soonho Lee, Gyeonggi-do (KR);
Namju Cho, Gyeonggi-do (KR);
Dooho Lee, Gyeonggi-do (KR);
Doosuk Kang, Gyeonggi-do (KR);
Sunkey Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/975,204

(22) PCT Filed: Jan. 21, 2019

(86) PCT No.: PCT/KR2019/000823
§ 371 (c)(1),
(2) Date: Aug. 24, 2020

(87) PCT Pub. No.: WO2019/208908
PCT Pub. Date: Oct. 31, 2019

(65) Prior Publication Data
US 2020/0404477 A1 Dec. 24, 2020

(30) Foreign Application Priority Data
Apr. 23, 2018 (KR) .......................... 10-2018-0046945

(51) Int. Cl.
*H04W 4/00* (2018.01)
*H04W 8/00* (2009.01)
(Continued)

(52) U.S. Cl.
CPC ........... *H04W 8/005* (2013.01); *H04W 48/16* (2013.01); *H04W 52/0216* (2013.01);
(Continued)

(58) Field of Classification Search
CPC . H04W 8/005; H04W 88/06; H04W 72/0453; H04W 48/16; H04W 52/0216;
(Continued)

(56) References Cited

U.S. PATENT DOCUMENTS 9,143,979 B1\* 9/2015 Lambert ................. H04L 5/003
9,392,630 B2\* 7/2016 Yi .......................... H04W 74/04
(Continued)

FOREIGN PATENT DOCUMENTS

KR 10-2015-0128830 A 11/2015
KR 10-2016-0117501 A 10/2016
(Continued)

*Primary Examiner* — Marceau Milord
(74) *Attorney, Agent, or Firm* — Cha & Reiter, LLC

(57) ABSTRACT

Disclosed is an electronic device. In addition, it is possible to implement various embodiment understood through the present disclosure. The electronic device transmits a first signal in a first frequency band including at least one of a synchronization beacon frame, a service discovery frame, or an action frame based on an NAN protocol at a first interval for a series of first durations, and transmits a second signal in a second frequency band including at least one of the synchronization beacon frame, the service discovery frame, or the action frame based on the NAN protocol at a second interval for a series of second durations.

11 Claims, 10 Drawing Sheets

(51) Int. Cl.
*H04W 48/16* (2009.01)
*H04W 52/02* (2009.01)
*H04W 72/04* (2009.01)
*H04W 84/18* (2009.01)
*H04W 88/06* (2009.01)

(52) U.S. Cl.
CPC ....... *H04W 72/0453* (2013.01); *H04W 84/18* (2013.01); *H04W 88/06* (2013.01)

(58) Field of Classification Search
CPC ....... H04W 84/18; H04W 8/00; H04W 72/04; H04W 52/02
USPC .......................................... 370/329, 328, 257
See application file for complete search history.

(56) References Cited

U.S. PATENT DOCUMENTS

| | | | |
|---|---|---|---|
| 9,510,286 B2 * | 11/2016 | Abraham | H04W 52/0225 |
| 9,648,485 B2 | 5/2017 | Abraham et al. | |
| 9,749,940 B2 | 8/2017 | Jung et al. | |
| 9,781,597 B2 * | 10/2017 | Kang | H04W 8/26 |
| 9,800,389 B2 | 10/2017 | Abraham et al. | |
| 9,999,017 B2 | 6/2018 | Abraham et al. | |
| 10,004,095 B2 | 6/2018 | Jung et al. | |
| 10,098,168 B2 * | 10/2018 | Liu | H04W 76/14 |
| 10,278,150 B2 | 4/2019 | Abraham et al. | |
| 10,506,504 B2 | 12/2019 | Jung et al. | |
| 10,548,178 B2 * | 1/2020 | Jung | H04W 76/14 |
| 10,568,158 B2 | 2/2020 | Liu et al. | |
| 2014/0065962 A1 * | 3/2014 | Le | H04M 1/72412 455/41.2 |
| 2014/0211659 A1 * | 7/2014 | Abraham | H04W 52/0209 370/254 |
| 2014/0293992 A1 * | 10/2014 | Abraham | H04W 56/0035 370/350 |
| 2014/0313966 A1 * | 10/2014 | Shukla | H04W 56/001 370/312 |
| 2015/0036540 A1 * | 2/2015 | Kasslin | H04W 48/16 370/254 |
| 2015/0109981 A1 * | 4/2015 | Patil | H04W 52/0212 370/336 |
| 2015/0172391 A1 * | 6/2015 | Kasslin | H04L 67/16 370/338 |
| 2015/0172901 A1 * | 6/2015 | Kasslin | H04W 8/005 370/328 |
| 2015/0172902 A1 * | 6/2015 | Kasslin | H04W 4/80 370/328 |
| 2015/0200811 A1 * | 7/2015 | Kasslin | H04L 41/0853 370/254 |
| 2016/0165653 A1 * | 6/2016 | Liu | H04W 8/005 370/329 |
| 2016/0219498 A1 * | 7/2016 | Abraham | H04W 56/001 |
| 2016/0242056 A1 * | 8/2016 | Patil | H04W 56/001 |
| 2016/0278112 A1 | 9/2016 | Liu et al. | |
| 2016/0286388 A1 * | 9/2016 | Marin | H04W 4/80 |
| 2016/0286574 A1 * | 9/2016 | Abraham | H04W 12/06 |
| 2016/0366578 A1 * | 12/2016 | Abraham | H04L 69/28 |
| 2017/0006562 A1 | 1/2017 | Kim et al. | |
| 2017/0013620 A1 | 1/2017 | Rajakarunanayake | |
| 2017/0041779 A1 * | 2/2017 | Sandhu | H04W 8/24 |
| 2017/0086157 A1 | 3/2017 | Abraham et al. | |
| 2017/0311240 A1 | 10/2017 | Jung et al. | |
| 2017/0317938 A1 * | 11/2017 | Abraham | H04L 47/24 |
| 2018/0183701 A1 * | 6/2018 | Qi | H04L 49/201 |
| 2019/0014610 A1 * | 1/2019 | Liu | H04W 72/12 |
| 2019/0140908 A1 * | 5/2019 | Ma | H04L 41/5058 |
| 2020/0288521 A1 * | 9/2020 | Bang | H04W 76/23 |
| 2021/0127244 A1 * | 4/2021 | Choi | H04W 88/06 |

FOREIGN PATENT DOCUMENTS

| | | |
|---|---|---|
| KR | 10-2018-0005471 A | 1/2018 |
| WO | 2017/065561 A1 | 4/2017 |

* cited by examiner

DEVICE AND METHOD FOR TRANSMITTING SIGNALS IN PLURALITY OF FREQUENCY BANDS

CROSS REFERENCE TO RELATED APPLICATIONS

This application is a National Phase Entry of PCT International Application No. PCT/KR2019/000823, which was filed on Jan. 21, 2019, and claims a priority to Korean Patent Application No. 10-2018-0046945, which was filed on Apr. 23, 2018, the contents of which are incorporated herein by reference.

TECHNICAL FIELD

Various embodiments of the disclosure relate to an apparatus and a method for transmitting signals in a plurality of frequency bands.

BACKGROUND ART

An electronic device may wireless communicate with another electronic device by using a local area network (LAN) as well as a wide area network (WAN). For example, the local area network may include Bluetooth, wireless fidelity (Wi-Fi), or near filed communication (NFC). Among Wi-Fi technologies, the neighbor awareness networking (NAN) protocol based on the NAN specification specifies a protocol capable of synchronizing the time when signals are transmitted and received between an electronic device and another electronic device. The electronic device may reduce power consumption by transmitting and receiving signals to and from another electronic device based on the NAN protocol.

DISCLOSURE

Technical Problem

According to the NAN standard, the electronic device may transmit a signal through a plurality of frequency bands. For example, the electronic device may support a 2.4 GHz band and a 5 GHz band. The 2.4 GHz band may refer to a frequency band with a center frequency of 2.4 GHz, and the 5 GHz band may refer to a frequency band with a center frequency of 5 GHz.

When the electronic device transmits a signal through a plurality of frequency bands during different durations, current consumption for processing the signal may occur for each frequency band. In addition, performance degradation of a specific frequency band among the plurality of frequency bands may occur due to an increase in network congestion, and wireless communication between an electronic device and another electronic device may be delayed during a duration for which the corresponding frequency band is used.

In various embodiments of the disclosure, an electronic device may transmit a signal during a duration in which a plurality of durations for which a plurality of frequency bands are used overlap at least partially in a network environment based on an NAN protocol.

Technical Solution

According to an aspect of the disclosure, an electronic device may include a housing, a plurality of antennas, at least one wireless communication circuit located in the housing and electrically connected to the plurality of antennas and configured to simultaneously process a signal in a first frequency band and a signal in a second frequency band higher than the first frequency band, based on a neighbor awareness networking (NAN) protocol, a processor located in the housing and operatively connected to the at least one wireless communication circuit, and a memory located in the housing and operatively connected to the processor, wherein the memory stores instructions that, when executed, cause the processor to transmit a first signal in the first frequency band including at least one of a synchronization beacon frame, a service discovery frame, or an action frame at a first interval for a series of first durations, and transmit a second signal in the second frequency band including at least one of the synchronization beacon frame, the service discovery frame, or the action frame at a second interval for a second duration at least partially overlapping the first duration.

According to another aspect of the disclosure, a method of an electronic device may include transmitting a first signal in a first frequency band including at least one of a synchronization beacon frame, a service discovery frame, or an action frame based on an NAN protocol at a first interval for a series of first durations, and transmitting a second signal in the second frequency band including at least one of the synchronization beacon frame, the service discovery frame, or the action frame at a second interval for a series of second durations.

According to still another aspect of the disclosure, an electronic device may include a plurality of antennas, at least one wireless communication circuit electrically connected to the plurality of antennas and configured to simultaneously process a signal in a first frequency band and a signal in a second frequency band higher than the first frequency band, based on a neighbor awareness networking (NAN) protocol, and a processor operatively connected to the at least one wireless communication circuit, wherein the processor is configured to transmit a first signal in the first frequency band including at least one of a synchronization beacon frame, a service discovery frame, or an action frame at a first interval for a series of first durations, transmit a second signal in the second frequency band including at least one of the synchronization beacon frame, the service discovery frame, or the action frame at a second interval for a second duration at least partially overlapping the first duration, and deactivate the plurality of antennas for a duration other than the first and second durations.

Advantageous Effects

According to various embodiments disclosed in the disclosure, an electronic device may transmit a signal in a second frequency band during a duration which at least partially overlaps a duration for which a first frequency band is used, so that it is possible to reduce current consumption.

According to various embodiments disclosed in the disclosure, the electronic device may transmit a signal through a second frequency band in a situation where network congestion of a first frequency band increases, so that it is possible to prevent the communication speed from decreasing.

In addition, various effects that are directly or indirectly understood through the present disclosure may be provided.

DESCRIPTION OF DRAWINGS

With regard to description of drawings, similar elements may be marked by similar reference numerals.

MODE FOR INVENTION

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
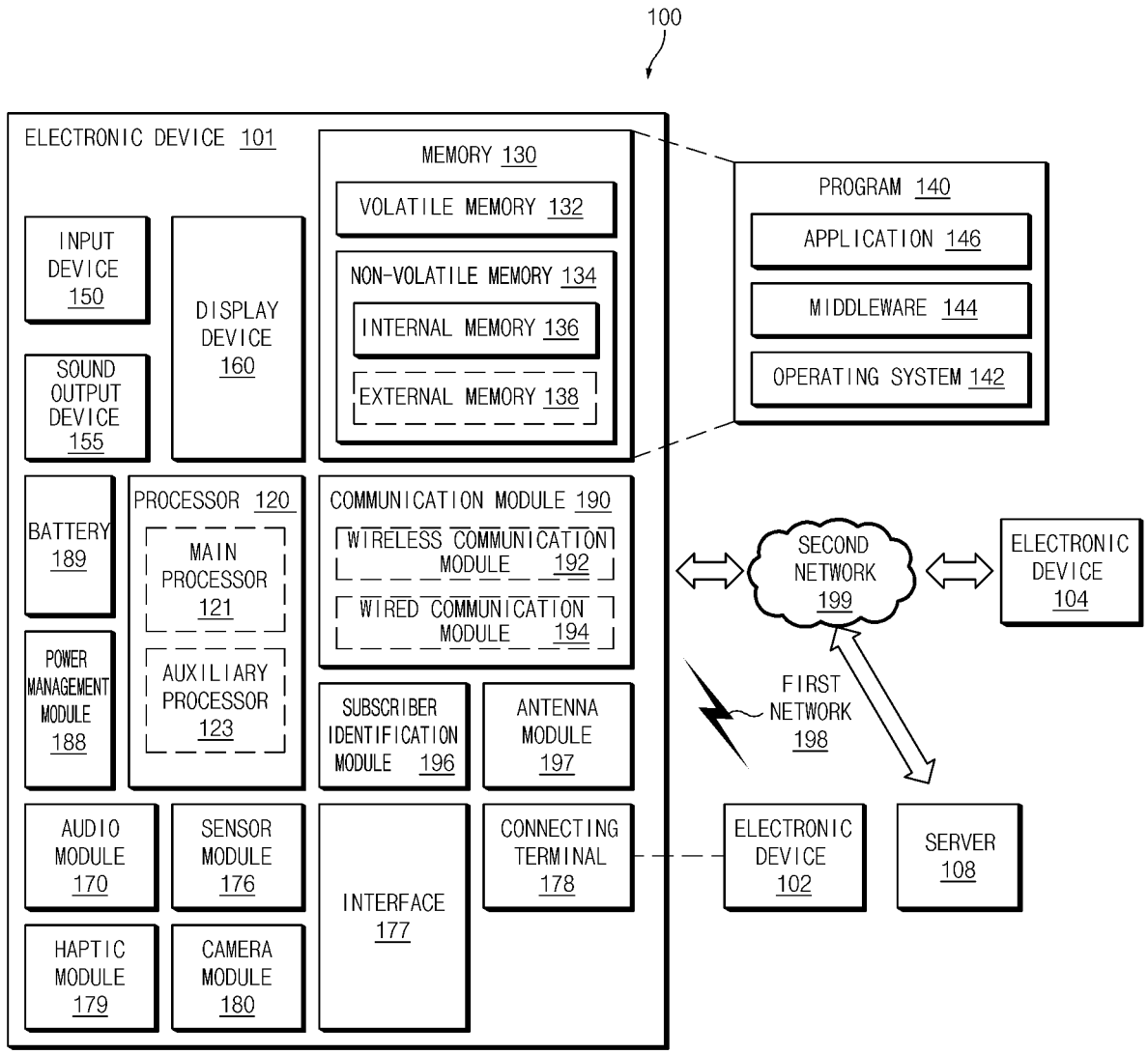
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
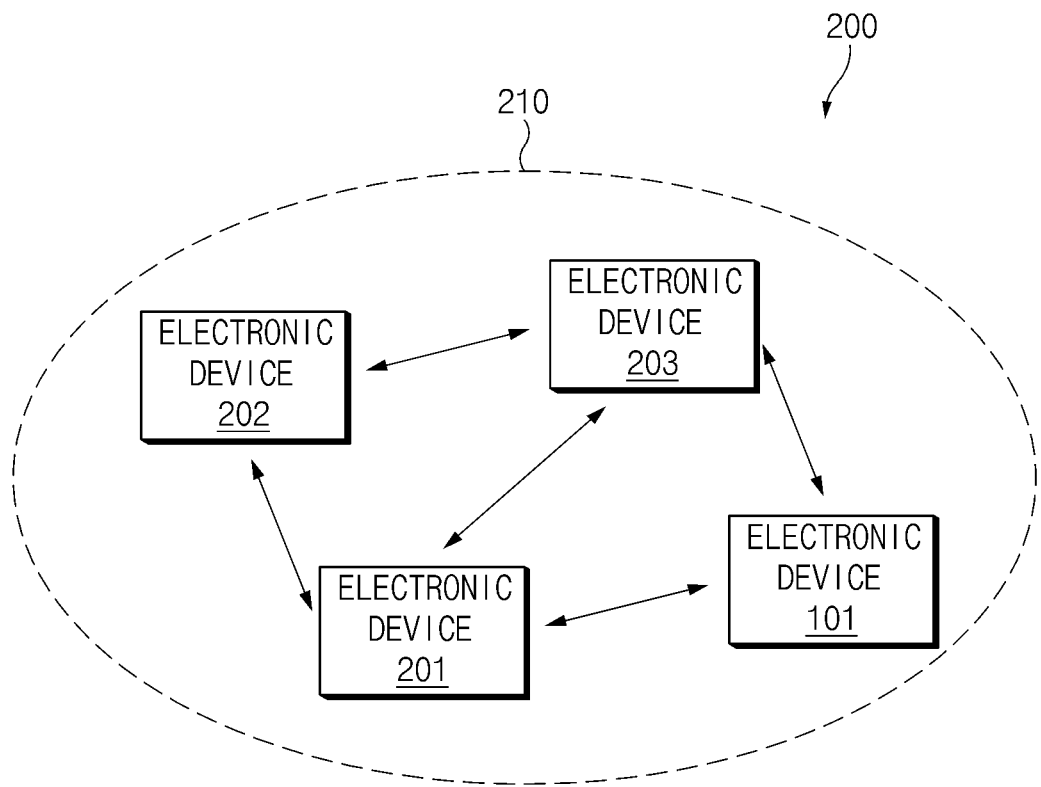
FIG. 2 is a view illustrating a cluster topology in a neighbor awareness networking (NAN) standard according to various embodiments.

FIG. 2 is a view illustrating a cluster 210 topology in a neighbor awareness networking (NAN) standard according to various embodiments.

Referring to FIG. 2, in a network 200 (e.g., the network 198 of FIG. 1), the cluster 210 may include a plurality of electronic devices 101, 201, 202 and 203. The number of electronic devices included in the cluster 210 is not limited to the example illustrated in FIG. 2. According to an embodiment, a plurality of electronic devices 101, 201, 202, and 203 may share information related to the NAN protocol. For example, the information related to the NAN protocol may include at least one of information about a series of durations in which the plurality of electronic devices 101, 201, 202 and 203 transmit and receive signals, and information about an interval between durations, and information about a channel (or frequency band) through which a signal is transmitted.

According to an embodiment, because the plurality of electronic devices 101, 201, 202 and 203 included in the cluster 210 synchronize times and channels (e.g., duration and an interval between durations) at which a signal is transmitted and received, the electronic device 101 may transmit a signal to another electronic device (e.g., at least one of 201, 202 and 203) at a specified interval during a series of (or consecutive) durations, or receive a signal from another electronic device. Because the plurality of electronic devices 101, 201, 202 and 203 included in the cluster 210 do not transmit or receive signals other than a specified duration, the plurality of electronic devices 101, 201, 202 and 203 deactivate at least some components such as the communication module 190 or the antenna module 197 of FIG. 1, thereby preventing power consumption.

Figure 3A:
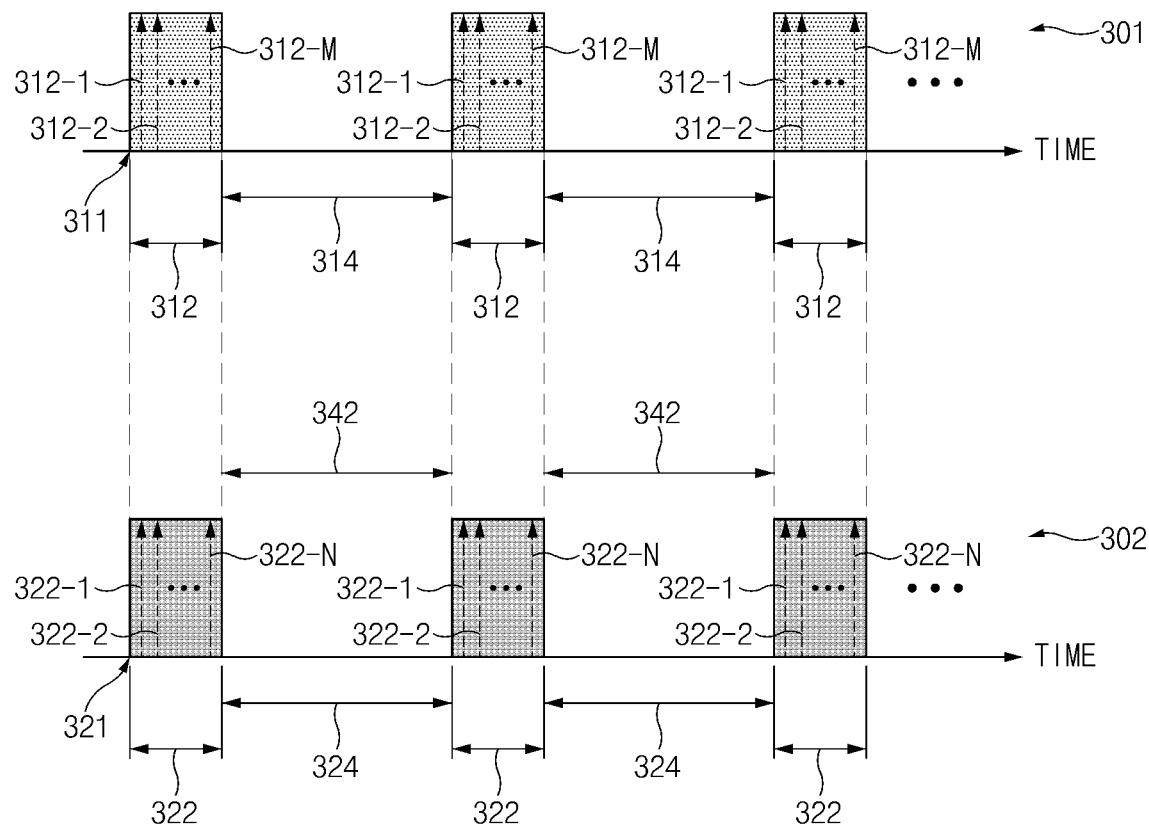
FIG. 3A is a view illustrating an operation of transmitting a signal during the same second duration as the first duration according to various embodiments.
Figure 3B:
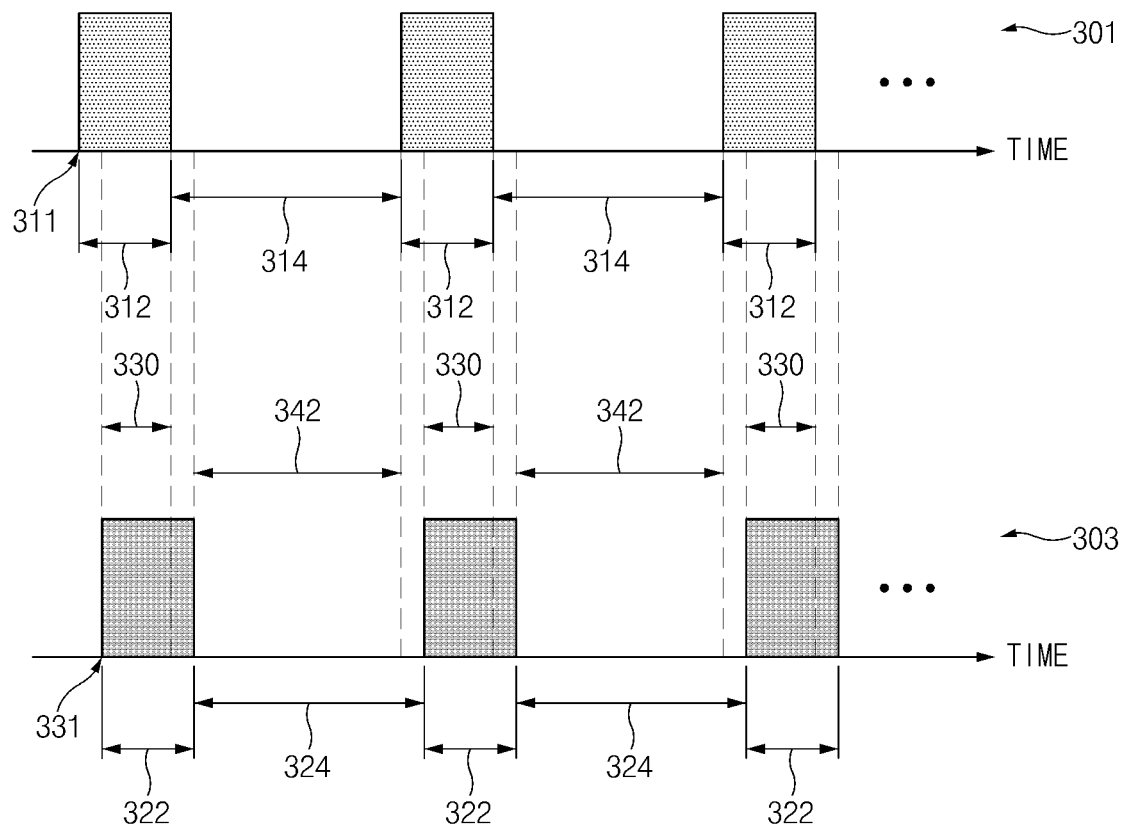
FIG. 3B is a view illustrating an operation of transmitting a signal during a second duration overlapping at least partially with the first duration according to various embodiments.
Figure 3C:
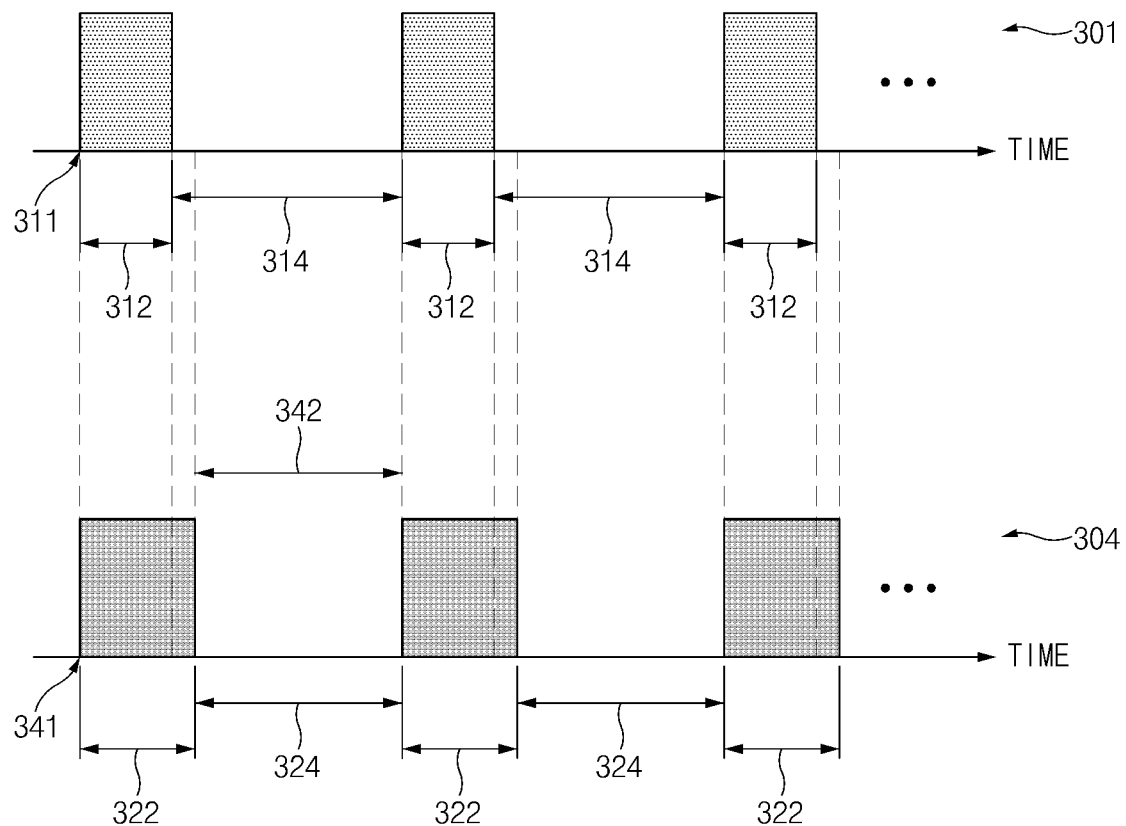
FIG. 3C is a view illustrating an operation of transmitting a signal during a second duration including a first duration according to various embodiments.

FIGS. 3A to 3C are views illustrating an operation in which the electronic device 101 transmits a signal to another electronic device (e.g., at least one of 201, 202 and 203) included in the cluster 210 by using a plurality of frequency bands. FIGS. 3A to 3C illustrate an embodiment in which the electronic device 101 transmits a signal, but an embodiment in which the electronic device 101 receives a signal from another electronic device included in the cluster 210 may be applied in the same principle.

FIG. 3A illustrates an operation of transmitting a second signal during the same second duration 322 as a first duration 312 for which a first signal is transmitted according to various embodiments.

Referring to FIG. 3A, a graph 301 represents an operation of transmitting a first signal (e.g., 312-1, 312-2, ..., 312-M, where 'M' is a natural number of 1 or more) at a first interval 314 during a series of first durations 312 in a first frequency band. A graph 302 represents an operation of transmitting a second signal (e.g., 322-1, 322-2, ..., 322-N, where 'N' is a natural number of 1 or more) at a second interval 324 during a series of second durations 322 in a second frequency band. For example, the first or second duration 312 or 322 may refer to a discovery window (DW) duration defined in the NAN standard. According to an embodiment, the first and second frequency bands may include different frequency bands. For example, the first frequency band may include a center frequency of 2.4 GHz, and the second frequency band may include a center frequency of 5 GHz. According to an embodiment, a technology by which the electronic device 101 transmits a signal using a plurality of frequency bands may be referred to as a real simultaneous dual band (RSDB).

According to an embodiment, to transmit the first signal, the electronic device 101 may activate at least one of the processor 120, the communication module 190, and the antenna module 197 during the series of first durations 312, and deactivate the activated at least one component for an interval (e.g., the first interval 314) other than the first duration 312. According to an embodiment, to transmit the second signal, the electronic device 101 may activate at least one of the processor 120, the communication module 190, and the antenna module 197 during a series of second durations 322, and deactivate at least one component for an interval (e.g., a second interval 324) other than the second duration 322. Components of the electronic device 101 activated or deactivated will be described with reference to FIGS. 4A and 4B.

According to an embodiment, the length of the second duration 322 may be the same as that of the first duration 312, the length of the second interval 324 may be the same as that of the first interval 314, and a start time point (e.g., a second time point 321) of the second duration 322 may be the same as that (e.g., a first time point 311) of the first duration 312. The electronic device 101 may reduce power consumption by setting the activation duration of the component for transmitting the first signal and the activation duration of the component for transmitting the second signal to be the same as each other. For example, when the sum of the lengths of the first duration 312 and the first interval 314 is 512 time units (TUs), and the length of the first duration 312 is 16 TUs, the sum of the lengths of the second duration 322 and the second interval 324 may also be 512 TUs, and the length of the second duration 322 can also be 16 TUs. In this case, the electronic device 101 can prevent current consumption by deactivating at least one component during 496 TUs (e.g., an interval 342) for which the first and second signals are not transmitted.

According to an embodiment, the first signal or the second signal may include at least one of a synchronization beacon frame, a service discovery frame, or an action frame defined in the NAN standard or IEEE 802.11 standard. For example, the synchronization beacon frame may include information necessary for the electronic device 101 to maintain synchronization with another electronic device (e.g., at least one of 201, 202 and 203). For example, the service discovery frame may include information related to a service used by another electronic device. The action frame may refer to a frame type necessary for the electronic device 101 to request an action of another electronic device.

According to an embodiment, the number of first signals transmitted during the first duration 312 and the type of frame included in the first signal may be the same as the number of second signals transmitted during the second duration 322 and the type of frame included in the second signal, or at least some may be different. For example, in a situation where the network congestion of the first frequency band increases, the electronic device 101 may transmit the second signal during the second duration 322, which includes a frame (e.g., the synchronization beacon frame, service discovery frame or action frame) of the same type as the first signal on the whole or partially, so that it is possible to prevent a communication delay from occurring. As another example, the electronic device 101 may transmit the first signal including the synchronization beacon frame during the first duration 312 and the second signal including the service discovery frame during the second duration 322, so that multiple functions may be performed in the same duration. As still another example, when it is necessary to transmit and receive a large file, the electronic device 101 may divide data into two, where one is transmitted through the first frequency band and the other through the second frequency band, so that the transmission speed may be improved. As still another example, the electronic device 101 may operate based on activation of the first or second frequency band. When an associated function is activated by using the first and second frequency bands in Wi-Fi communication, the electronic device 101 may transmit and receive information through the second frequency band during the second duration 322. As still another example, when there is a device supporting the second frequency band near the electronic device, the electronic device 101 may transmit and receive the second signal including a frame of which the type is the same as that of the first signal on the whole or partially, during the second duration 322.

FIG. 3B is a view illustrating an operation of transmitting a second signal during the second duration 322 that overlaps at least partially with the first duration 312 according to various embodiments. Although the first signal (e.g., 321-1, 321-2, ..., 321-M) transmitted in the first duration 312 and the second signal (e.g., 322-1, 322-2, ... 322-N) transmitted in the second duration 322 are not separately shown to more clearly indicate the difference between the lengths or the start time points of the first and second durations 312 and 322 in FIGS. 3B, 3C, and 6 described below, the first signal may be transmitted during the first duration 312 and the second signal may be transmitted during the second duration 322 in the same principle as in FIG. 3A.

Referring to FIG. 3B, a graph 303 illustrates an example in which the second duration 322 partially overlaps the first duration 312. According to an embodiment, the length of the second duration 322 is the same as that of the first duration 312, the length of the second interval 324 is the same as that of the first interval 314, and the start time point (e.g., a second time point 331) of the second duration 322 may be different from the start time point (e.g., the first time point 311) of the first duration 312. For example, when the sum of the lengths of the first duration 312 and the first interval 314 is 512 TUs, and the length of the first duration 312 is 16 TUs, the sum of the lengths of the second duration 322 and the second interval 324 may also be 512 TUs, and the length of the second duration 322 may also be 16 TUs. The electronic device 101 may transmit the second signal from the second time point 331 after 4 TUs from the first time point 311. The electronic device 101 may simultaneously transmit the first and second signals during 12 TUs (e.g., a duration 330) in which the first duration 312 and the second duration 322 overlap. The electronic device 101 may deactivate at least one component during 488 TUs (e.g., the interval 342) in which both the first and second signals are not transmitted, thereby preventing current consumption.

FIG. 3C illustrates an operation of transmitting the second signal during the second duration 322 including the first duration 312 according to various embodiments.

Referring to FIG. 3C, a graph 304 illustrates an example in which the length of the second duration 322 is longer than that of the first duration 312. According to an embodiment, the length of the second duration 322 may be longer than that of the first duration 312, the length of the second interval 324 may be shorter than that of the first interval 314, and the start time point (e.g., a second time point 341) of the second duration 322 may be the same as that (e.g., the first time point 311) of the first duration 312. For example, when the sum of the length of the first duration 312 and the length of the first interval 314 is 512 TUs and the length of the first duration 312 is 16 TUs, the sum of the length of the second duration 322 and the lengths of the second interval 324 may also be 512 TUs, while the length of the second duration 322 may be 20 TUs. The electronic device 101 may simultaneously transmit the first and second signals during 16 TUs (e.g., the first duration 312) for which the first and second durations 312 and 322 overlap. The electronic device 101 may deactivate at least one component during 492 TUs (e.g., the interval 342) for which both the first and second signals are not transmitted, thereby preventing current consumption. Although not shown in FIG. 3C, according to an embodiment, the length of the second duration 322 may be longer than that of the first duration 312, and the second start time point 341 may be different from the first start time point 311. For example, the second start time point 341 may be before or after the first start time point.

Figure 4A:
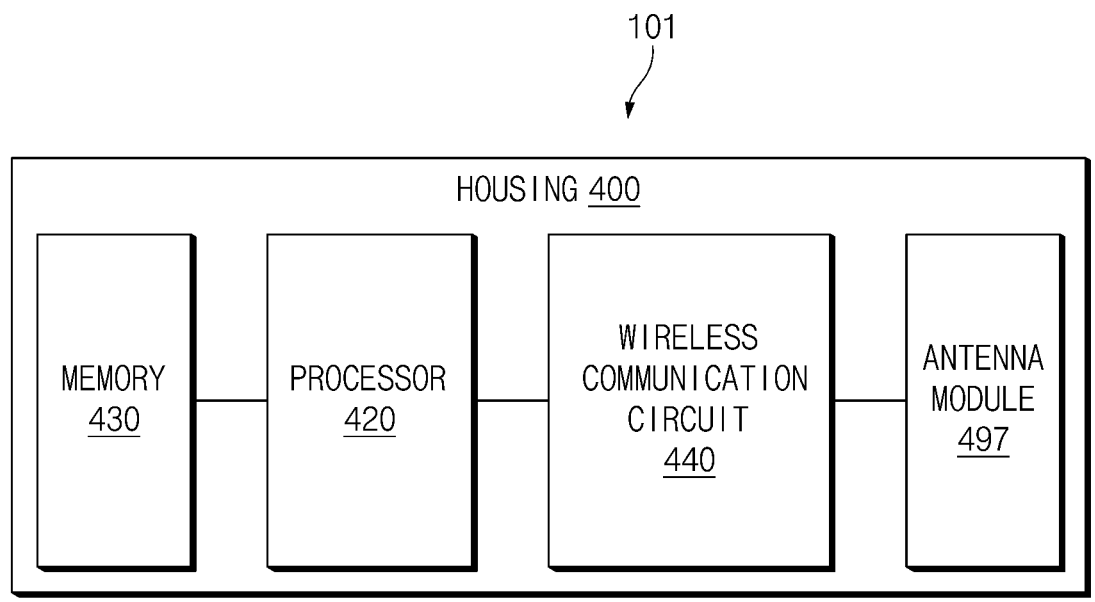
FIG. 4A is a block diagram of an electronic device that transmits a signal in a plurality of frequency bands according to various embodiments.

FIG. 4A is a block diagram of the electronic device 101 that transmits a signal in a plurality of frequency bands according to various embodiments.

Referring to FIG. 4A, the electronic device 101 may include a housing 400, an antenna module 497 (e.g., the antenna module 197 of FIG. 1), a wireless communication circuit 440 (e.g., at least a portion of the communication module 190 of FIG. 1), a processor 420 (e.g., at least a portion of the processor 120 or the communication module 190 of FIG. 1), and a memory 430 (e.g., the memory 130 of FIG. 1).

According to an embodiment, the antenna module 497 may include at least one antenna. For example, when the electronic device 101 supports single input single output (SISO) technology, the antenna module 497 may include one antenna. As another example, when the electronic device 101 supports multiple input multiple output (MIMO) technology, the antenna module 497 may include a plurality of antennas. According to an embodiment, the antenna module 497 may emit at least one of the first and second signals under control of the processor 420.

According to an embodiment, the wireless communication circuit 440 may be located in the housing 400 and may be electrically connected to the antenna module 497. According to an embodiment, the wireless communication circuit 440 may include at least one radio frequency (RF) circuit. According to an embodiment, the wireless communication circuit 440 may process at least one of a signal in the first frequency band and a signal in the second frequency band based on the NAN protocol. When the electronic device 101 supports RSDB technology, the wireless communication circuit 440 may be configured to simultaneously process signals in the first and second frequency bands.

According to an embodiment, the processor 420 may be located in the housing 400 and may be operatively connected to the wireless communication circuit 400. For example, the processor 420 may include at least one of an application processor (AP) and a communication processor (CP). According to an embodiment, the processor 420 may perform the overall function of the electronic device 101 based on instructions stored in the memory 430. For example, the processor 420 may process at least one of the first and second signals by using the wireless communication circuit 440, and emit at least one of the first and second signals through the antenna module 497. The processor 420 may transmit the first signal having the first frequency band during a series of first durations 312 and transmit the second signal having the second frequency band during the second duration 322 that at least partially overlaps the first duration 312.

According to an embodiment, the processor 420 may deactivate at least some components of the electronic device 101 during duration (e.g., the interval 342 of FIG. 3) for which the first and second signals are not transmitted, thereby reducing the current consumption of the electronic device 101. For example, the processor 420 may deactivate at least one of the antenna module 497 and the wireless communication circuit 440. As another example, the processor 420 may deactivate a part (e.g., the main processor 121 or the auxiliary processor 123 of FIG. 1) of the processor 420.

According to an embodiment, the memory 430 is located in the housing 400 and may be operatively connected to the processor 420. According to an embodiment, the memory 430 may store instructions to allow the processor 420 to perform the overall function of the electronic device 101.

Figure 4B:
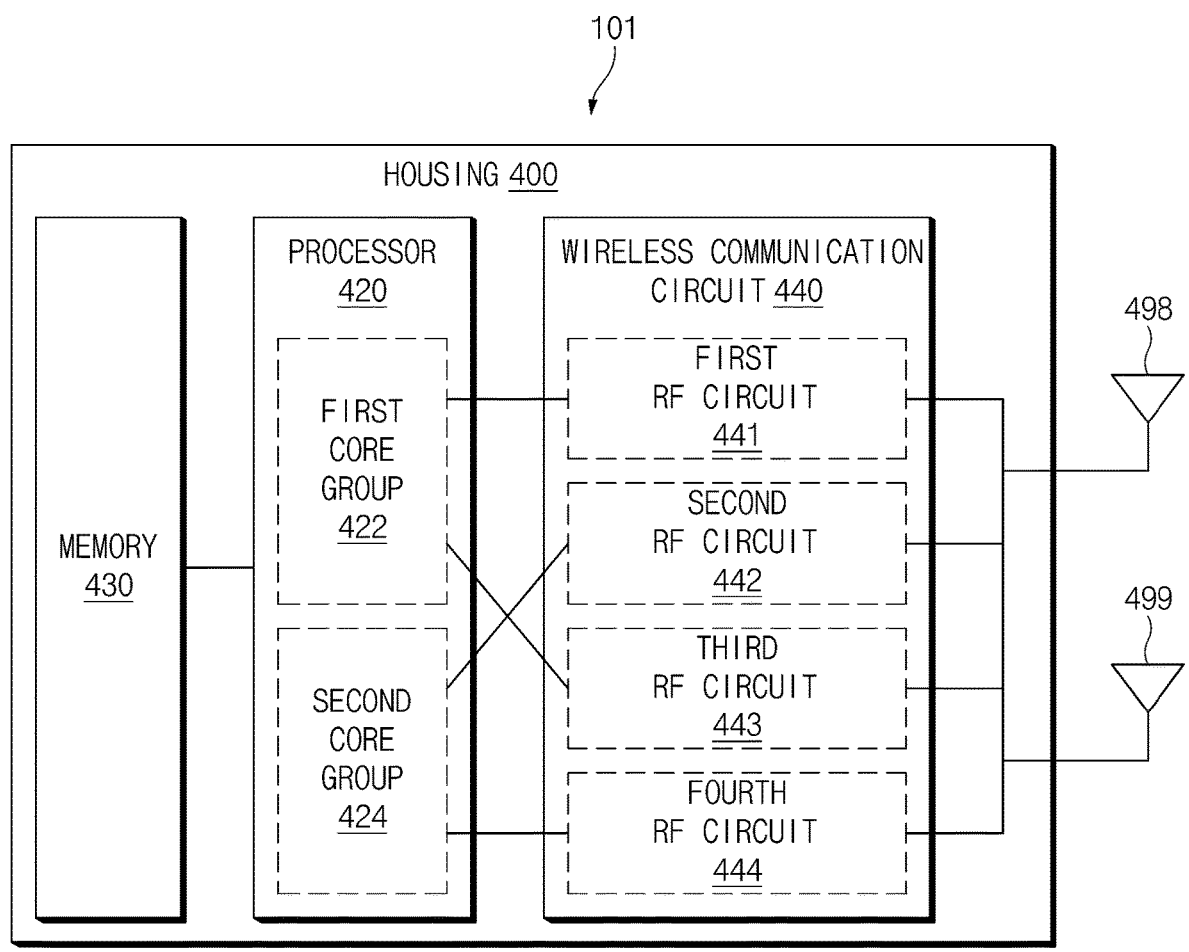
FIG. 4B is a block diagram of an electronic device that transmits a signal by using real simultaneous dual band (RSDB) and multiple input multiple output (MIMO) technology according to various embodiments.

FIG. 4B is a block diagram of an electronic device that transmits a signal by using RSDB and MIMO technology according to various embodiments.

Referring to FIG. 4B, the electronic device 101 may include a first antenna 498 and a second antenna 499 to use 2×2 MIMO technology. The first and second antennas 498 and 499 may be included in the antenna module 497 of FIG. 4A. According to an embodiment, each of the first and second antennas 498 and 499 may be configured to support the first and second frequency bands. For example, the processor 420 may transmit the first signal during the first duration 312 by simultaneously activating the first and second antennas 498 and 499. As another example, the processor 420 may transmit the second signal during the second duration 322 by simultaneously activating the first and second antennas 498 and 499. When the second duration 322 overlaps at least partially with the first duration 312, the durations for which the first and second antennas 498 and 499 are deactivated may increase, so that the electronic device 101 may reduce the power consumption required to activate the first and second antennas 498 and 499.

According to an embodiment, the wireless communication circuit 440 may include a first RF circuit 441 configured to support a first frequency band, a second RF circuit 442 configured to support a second frequency band, a third RF circuit 443 configured to support the first frequency band, and a fourth RF circuit 444 configured to support the second frequency band. For example, when the electronic device 101 simultaneously transmits the first and second signals, the processor 420 may transmit the first signal through the first and third RF circuits 441 and 443, and transmit the second signal through the second and fourth RF circuits 442 and 444. According to an embodiment, the first and second antennas 498 and 499 may be electrically connected to the first to fourth RF circuits 441 to 444.

According to an embodiment, the processor 420 may include a first core group 422 and a second core group 424. Each of the first and second core groups 422 and 424 may include at least one core. The core may mean units of software or hardware that processes data to transmit signals in a plurality of frequency bands specified in IEEE 802.11. According to an embodiment, the first core group 422 may process a signal in the first frequency band, and the second core group 424 may process a signal in the second frequency band. According to an embodiment, the first and third RF circuit 441 and 443 may be electrically connected to the first core group 422 and the second and fourth RF circuit 442 and 444 may be electrically connected to the second core group 424.

According to one embodiment, the processor 420 may activate the first core group 422 during the first duration 312 for which the first signal is transmitted, and activate the second core group 424 during the second duration 322 for which the second signal is transmitted. The processor 420 may consume power to activate the first or second core group 422 or 424. When the first and second durations 312 and 322 overlap at least partially, because the operation durations for which the processor 420 activates the core groups overlap at least partially, the electronic device 101 may reduce the power required to activate the core groups.

Although not shown in FIG. 4B, the electronic device 101 may further include a component to receive a signal (e.g., a wake up signal) with low power in an RSDB structure. For example, the electronic device 101 may further include a low power wake-up receiver for supporting 801.11ba so that the current consumption is reduced.

Figure 5:
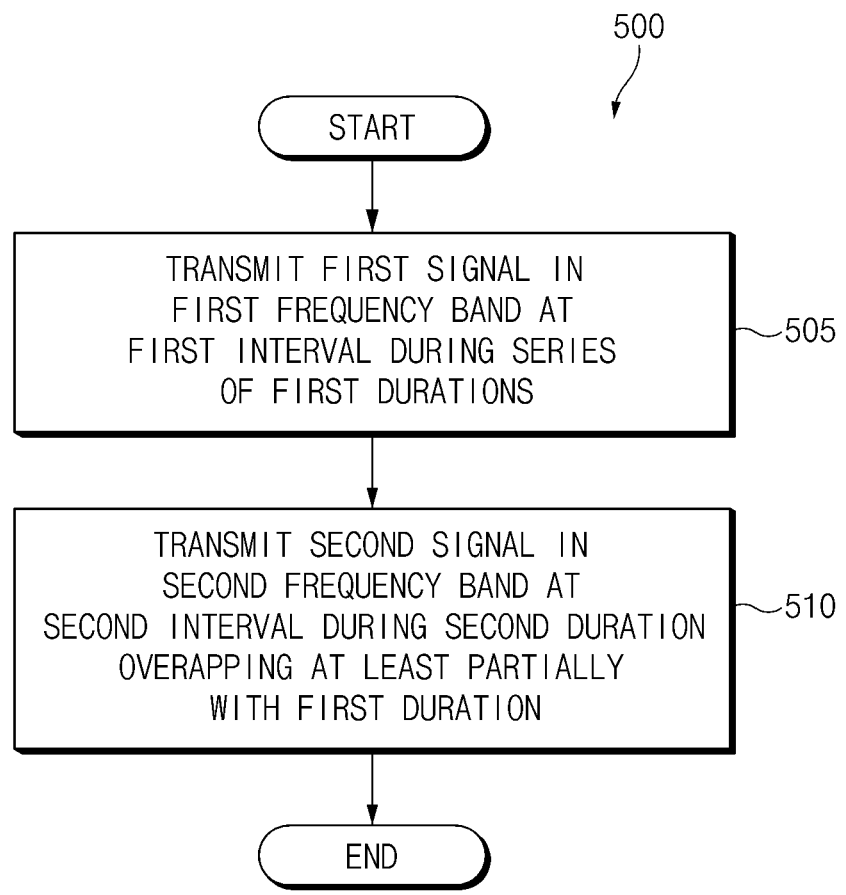
FIG. 5 is a flowchart illustrating an operation of an electronic device for transmitting a signal during a second duration that overlaps at least partially with a first duration according to various embodiments.

FIG. 5 is a flowchart illustrating an operation of the electronic device 101 for transmitting a signal during the second duration 322 that overlaps at least partially with the first duration 312 according to various embodiments. The operations illustrated in FIG. 5 may be performed by the electronic device 101 or the processor 420.

Referring to a method 500 of FIG. 5, in operation 505, the electronic device 101 (e.g., the processor 420) may transmit the first signal in the first frequency band at the first interval 314 during a series of first durations 312. According to an embodiment, the first signal may include at least one of the synchronization beacon frame, the service discovery frame, or the action frame.

In operation 510, the electronic device 101 may transmit the second signal in the second frequency band higher than the first frequency band at the second interval 324 during a series of second durations 322. According to an embodiment, the second signal may include a frame of the same type as the first signal, or at least partially different. According to an embodiment, the second duration 322 may overlap at least partially with the first duration 312. For example, the start time point of the second duration 322 is the same as that of the first duration 312, and the length of the second duration 322 may be the same as that of the first duration 312. As another example, the length of the second duration 322 is the same as that of the first duration 312, and the start time point of the first duration 322 may be different from that of the first duration 312. For another example, the start time point of the second duration 322 is the same as the start time point of the first duration 312, and the length of the second duration 322 may be longer than that of the first duration 312.

Figure 6:
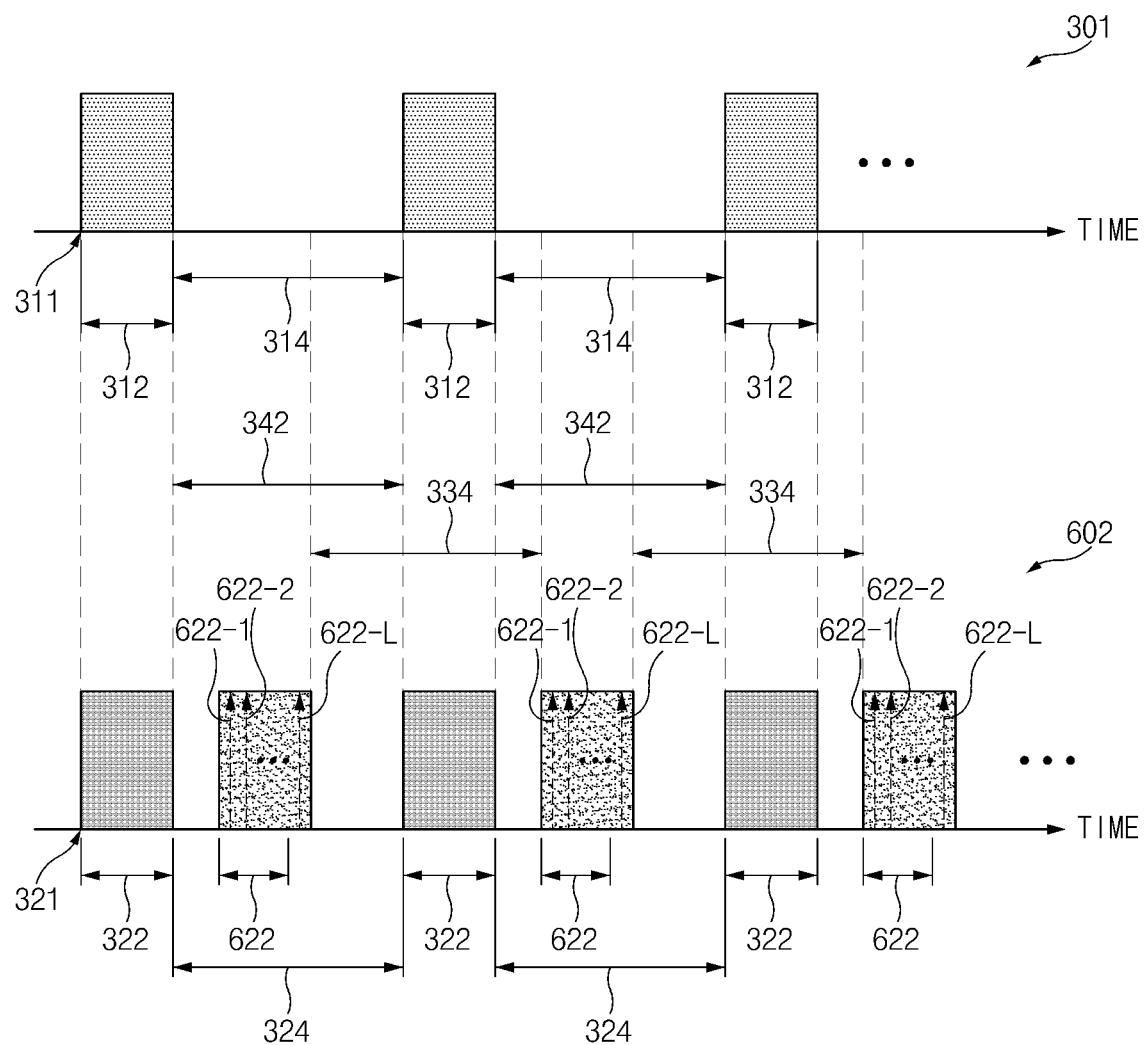
FIG. 6 is a view illustrating an operation of transmitting a signal during a third duration that does not overlap with first and second durations according to various embodiments.

FIG. 6 is a view illustrating an operation of transmitting a third signal during a third duration 622 that does not overlap with the first and second durations 312 and 322 according to various embodiments.

Referring to FIG. 6, a graph 602 represents an operation of transmitting a third signal (e.g., 662-1, 622-2, ..., 622-L, where 'L' is a natural number greater than or equal to '1') in the second frequency band. According to an embodiment, the third duration 622 may refer to a DW duration specified in the NAN standard. According to an embodiment, the third duration 622 may not overlap with the first and second durations 312 and 322. For example, the electronic device 101 may transmit the third signal during the first interval 314 (or the second interval 324). For example, the third signal may include at least one of the synchronization beacon frame, the service discovery frame, or the action frame.

According to an embodiment, the length of the third duration 622 may be the same as those of the first and second durations 312 and 322. Although not shown in FIG. 6, according to an embodiment, the length of the third duration 622 may be different from those of the first and second durations 312 and 322. According to an embodiment, in order to transmit the first or second signal while the electronic device 101 does not transmit the third signal, the length of the duration (e.g., an interval 334) for which the third signal is not transmitted may be longer than that of the first or second duration 312 or 322.

According to an embodiment, the number of third signals transmitted during the third duration 622 and the type of a frame included in the third signal may be the same as or at least partially different from the number of second signals and the type of a frame included in the second signal transmitted during the second duration 322. For example, when the second signal is not transmitted to another electronic device during the second duration 322, the electronic device 101 may transmit the third signal including the same frame as the second signal during the third duration 622, thereby increasing the success rate of information transmission.

FIG. 6 illustrates the operation of transmitting the third signal in the embodiment of FIG. 3A in which the start time point and length of the second duration 322 are the same as the start time point and length of the first duration 312, and the same principle may be applied in FIGS. 3B and 3C. For example, the electronic device 101 may transmit the third signal during a duration (e.g., the interval 342 in FIG. 3) for which the first and second signals are not transmitted.

Figure 7:
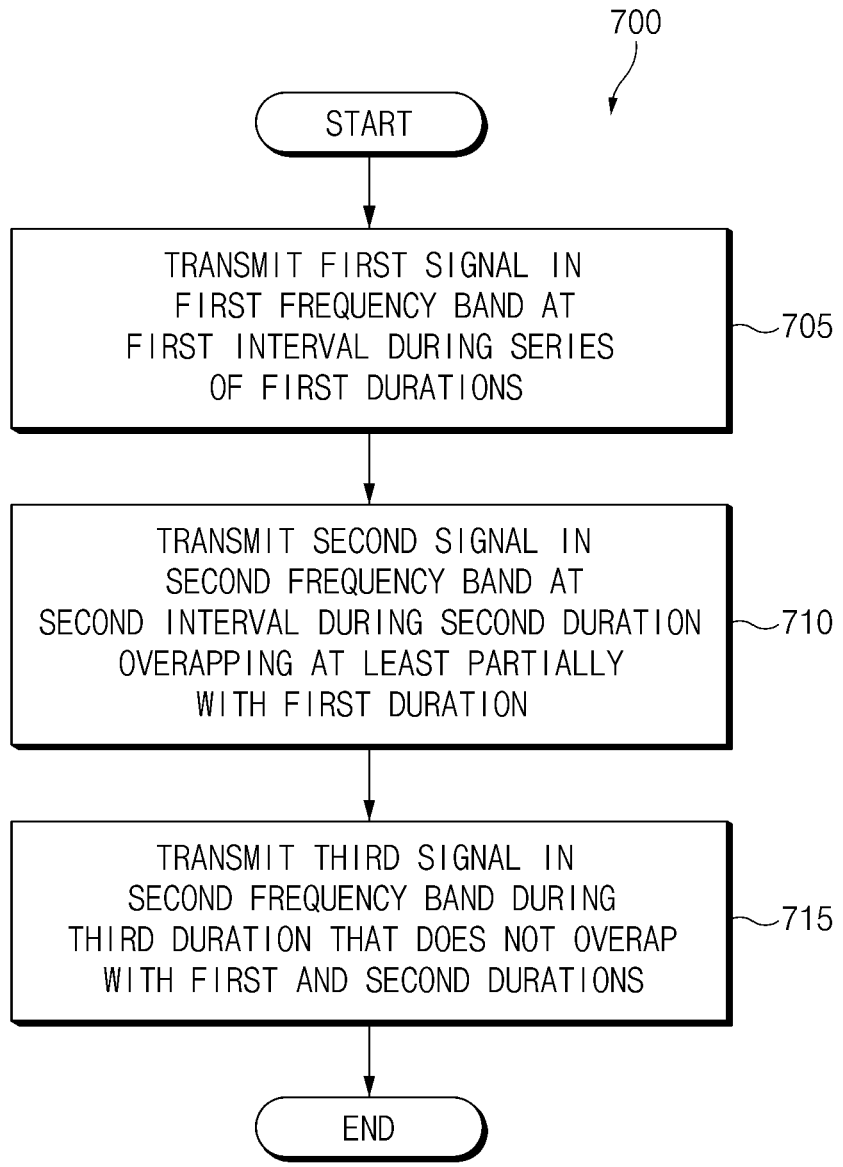
FIG. 7 is a flowchart illustrating an operation of an electronic device that transmits a signal during a third duration that does not overlap with first and second durations according to various embodiments.

FIG. 7 is a flowchart illustrating an operation of an electronic device that transmits a signal during the third duration 622 that does not overlap with the first and second durations 312 and 322 according to various embodiments. The operations illustrated in FIG. 7 may be performed by the electronic device 101 or the processor 420.

Referring to a method 700 of FIG. 7, in operation 705, the electronic device 101 (e.g., the processor 420) may transmit the first signal in the first frequency band at the first interval 314 during a series of first durations 312. According to an embodiment, the first signal may include at least one of the synchronization beacon frame, the service discovery frame, or the action frame.

In operation 710, the electronic device 101 may transmit the second signal in the second frequency band higher than the first frequency band at the second interval 324 during a series of second durations 322. According to an embodiment, the second signal may include a frame of the same type as the first signal, or at least partially different. According to an embodiment, the second duration 322 may overlap at least partially with the first duration 312.

In operation 715, the electronic device 101 may transmit the third signal in the second frequency band during the third duration 622 that does not overlap with the first and second durations 312 and 322. For example, the electronic device 101 may transmit the third signal during an interval (e.g., the interval 342 in FIG. 3) for which the first and second signals are not transmitted.

As described above, an electronic device (e.g., 101) may include a housing (e.g., 400), a plurality of antennas (e.g., the antenna module 497 of FIG. 4A), at least one wireless communication circuit (e.g., 440) located in the housing and electrically connected to the plurality of antennas and configured to simultaneously process a signal in a first frequency band and a signal in a second frequency band higher than the first frequency band, based on a neighbor awareness networking (NAN) protocol, a processor (e.g., 420) located in the housing and operatively connected to the at least one wireless communication circuit, and a memory located in the housing and operatively connected to the processor, wherein the memory stores instructions that, when executed, cause the processor to transmit a first signal (e.g., 312-1, 312-2, . . . , 312-M) in the first frequency band including at least one of a synchronization beacon frame, a service discovery frame, or an action frame at a first interval (e.g., 314) for a series of first durations (e.g., 312), and transmit a second signal (e.g., 322-1, 322-2, . . . , 322-N) in the second frequency band including at least one of the synchronization beacon frame, the service discovery frame, or the action frame at a second interval (e.g., 324) for a second duration (e.g., 322) at least partially overlapping the first duration.

According to an embodiment, the first frequency band may include a center frequency of 2.4 GHz, and the second frequency band may include a center frequency of 5 GHz.

According to an embodiment, the first signal may include the synchronization beacon frame, and the second signal includes the service discovery frame.

According to an embodiment, the second duration may be longer than the first duration.

According to an embodiment, the instructions may cause the processor to transmit a third signal (e.g., 662-1, 622-2, . . . , 622-L) in the second frequency band including at least one of the service discovery frame or the action frame at a third interval (e.g., 334) for a third duration (e.g., 622) that does not overlap with the first and second durations.

According to an embodiment, the at least one wireless communication circuit may include a first RF circuit (e.g., 441) that supports the first frequency band, a second RF circuit (e.g., 442) that supports the second frequency band, a third RF circuit (e.g., 443) that supports the first frequency band, and fourth RF circuit (e.g., 444) that supports the second frequency band, and the plurality of antennas may include a first antenna (e.g., 498) electrically connected to the first to fourth RF circuits, and a second antenna (e.g., 499) electrically connected to the first to fourth RF circuits.

According to an embodiment, the processor may be caused to activate the plurality of antennas for the first or second duration, and deactivate the plurality of antennas for a duration other than the first and second durations.

According to an embodiment, the second signal may include a frame that is same as a frame included in the first signal.

As described above, a method (e.g., 500) of an electronic device may include an operation (e.g., 505) of transmitting a first signal in a first frequency band including at least one of a synchronization beacon frame, a service discovery frame, or an action frame based on an NAN protocol at a first interval for a series of first durations, and an operation (e.g., 510) of transmitting a second signal in the second frequency band including at least one of the synchronization beacon frame, the service discovery frame, or the action frame at a second interval for a series of second durations.

According to an embodiment, the first frequency band may include a center frequency of 2.4 GHz, and the second frequency band may include a center frequency of 5 GHz.

According to an embodiment, the first signal may include the synchronization beacon frame, and the second signal includes the service discovery frame.

According to an embodiment, the second duration may be longer than the first duration.

According to an embodiment, the method may further include an operation (e.g., 715) of transmitting a third signal (e.g., 662-1, 622-2, ..., 622-L) in the second frequency band including at least one of the service discovery frame or the action frame at a third interval for a third duration that does not overlap with the first and second durations.

According to an embodiment, the method may further include an operation of activating a plurality of antennas of the electronic device for the first or second duration, and an operation of deactivating the plurality of antennas for a duration other than the first and second durations.

According to an embodiment, the second signal may include a frame that is same as a frame included in the first signal.

As described above, an electronic device (e.g., 101) may include a plurality of antennas (e.g., the antenna module 497 of FIG. 4A), at least one wireless communication circuit (e.g., 440) electrically connected to the plurality of antennas and configured to simultaneously process a signal in a first frequency band and a signal in a second frequency band higher than the first frequency band, based on a neighbor awareness networking (NAN) protocol, and a processor (e.g., 420) operatively connected to the at least one wireless communication circuit, wherein the processor is configured to transmit a first signal (e.g., 312-1, 312-2, ..., 312-M) in the first frequency band including at least one of a synchronization beacon frame, a service discovery frame, or an action frame at a first interval (e.g., 314) for a series of first durations (e.g., 312), transmit a second signal (e.g., 322-1, 322-2, ..., 322-N) in the second frequency band including at least one of the synchronization beacon frame, the service discovery frame, or the action frame at a second interval (e.g., 324) for a second duration (e.g., 322) at least partially overlapping the first duration, and deactivate the plurality of antennas for a duration other than the first and second durations.

According to an embodiment, the first frequency band may include a center frequency of 2.4 GHz, the second frequency band may include a center frequency of 5 GHz, the first signal may include the synchronization beacon frame, and the second signal may include the service discovery frame.

According to an embodiment, the second duration may be longer than the first duration.

According to an embodiment, the processor may be configured to transmit a third signal (e.g., 662-1, 622-2, ..., 622-L) in the second frequency band including at least one of the service discovery frame or the action frame at a third interval (e.g., 334) for a third duration (e.g., 622) that does not overlap with the first and second durations.

According to an embodiment, the at least one wireless communication circuit may include a first RF circuit (e.g., 441) that supports the first frequency band, a second RF circuit (e.g., 442) that supports the second frequency band, a third RF circuit (e.g., 443) that supports the first frequency band, and fourth RF circuit (e.g., 444) that supports the second frequency band, and the plurality of antennas may include a first antenna (e.g., 498) electrically connected to the first to fourth RF circuits, and a second antenna (e.g., 499) electrically connected to the first to fourth RF circuits.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising: a housing; a plurality of antennas;
at least one wireless communication circuit located in the housing and electrically connected to the plurality of antennas and configured to simultaneously process a signal in a first frequency band and a signal in a second frequency band higher than the first frequency band, based on a neighbor awareness networking (NAN) protocol; a processor located in the housing and operatively connected to the at least one wireless communication circuit; and a memory located in the housing and operatively connected to the processor, wherein the memory stores instructions that, when executed, cause the processor to: transmit a first signal in the first frequency band including at least one of a synchronization beacon frame, a service discovery frame, or an action frame during a first discovery window, transmit a second signal in the second frequency band including at least one of the synchronization beacon frame, the service discovery frame, or the action frame during the first discovery window where the first signal is being transmitted and designated to the first frequency band, and transmit a third signal in the second frequency band including at least one of the service discovery frame or the action frame during a duration that does not overlap with the first discovery window.

2. The electronic device of claim 1, wherein the first frequency band includes a center frequency of 2.4 GHz, and the second frequency band includes a center frequency of 5 GHz.

3. The electronic device of claim 2, wherein the first signal includes the synchronization beacon frame, and wherein the second signal includes the service discovery frame.

4. The electronic device of claim 1, wherein the at least one wireless communication circuit includes:
a first radio frequency (RF) circuit configured to support the first frequency band;
a second RF circuit configured to support the second frequency band;
a third RF circuit configured to support the first frequency band; and
a fourth RF circuit configured to support the second frequency band, and
wherein the plurality of antennas includes:
a first antenna electrically connected to the first to fourth RF circuits; and
a second antenna electrically connected to the first to fourth RF circuits.

5. The electronic device of claim 1, wherein the instructions cause the processor to:
activate the plurality of antennas for the first discovery window, and
deactivate the plurality of antennas for a duration other than the first discovery window.

6. The electronic device of claim 1, wherein the second signal includes a frame that is same as a frame included in the first signal.

7. A method of an electronic device, the method comprising: transmitting a first signal in a first frequency band including at least one of a synchronization beacon frame, a service discovery frame, or an action frame based on an NAN protocol during a first discovery window, transmitting a second signal in a second frequency band including at least one of the synchronization beacon frame, the service discovery frame, or the action frame during the first discovery window where the first signal is being transmitted and designated to the first frequency band and transmitting a third signal in the second frequency band including at least one of the service discovery frame or the action frame during a duration that does not overlap with the first discovery window.

8. The method of claim 7, wherein the first frequency band includes a center frequency of 2.4 GHz, and wherein the second frequency band includes a center frequency of 5 GHz.

9. The method of claim 8, wherein the first signal includes the synchronization beacon frame, and wherein the second signal includes the service discovery frame.

10. The method of claim 7, further comprising:
activating a plurality of antennas of the electronic device for the first discovery window, and
deactivating the plurality of antennas for a duration other than the first discovery window.

11. The method of claim 7, wherein the second signal includes a frame that is same as a frame included in the first signal.

* * * * *